United States Patent
Kim et al.

(10) Patent No.: US 10,846,019 B2
(45) Date of Patent: Nov. 24, 2020

(54) SEMICONDUCTOR DEVICE

(71) Applicant: SAMSUNG ELECTRONICS CO., LTD., Suwon-si (KR)

(72) Inventors: Jung Hoon Kim, Yongin-si (KR); Young-Sik Lee, Seoul (KR); Kang Ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 16/055,196

(22) Filed: Aug. 6, 2018

(65) Prior Publication Data

US 2019/0171393 A1 Jun. 6, 2019

(30) Foreign Application Priority Data

Dec. 6, 2017 (KR) .................. 10-2017-0166817

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,304,948 B1 | 10/2001 | Motoyama et al. | |
| 7,143,008 B2 | 11/2006 | Ochi et al. | |
| 7,380,064 B2 | 5/2008 | Murotani et al. | |
| 7,496,555 B2 | 2/2009 | Margolus | |
| 7,590,600 B2 | 9/2009 | Bovee et al. | |
| 7,613,871 B2 | 11/2009 | Tanaka et al. | |
| 9,075,851 B2 | 7/2015 | Kilian et al. | |
| 9,471,232 B2 | 10/2016 | Koren et al. | |
| 9,519,647 B2 | 12/2016 | Batwara et al. | |
| 2003/0028652 A1 | 2/2003 | Bardini et al. | |
| 2005/0160481 A1* | 7/2005 | Todd | G06F 16/125 726/30 |
| 2005/0257021 A1* | 11/2005 | James | G06F 13/1684 711/170 |
| 2006/0288153 A1 | 12/2006 | Tanaka et al. | |
| 2008/0235304 A1* | 9/2008 | Fujii | G06F 3/0611 |
| 2008/0279382 A1* | 11/2008 | Chen | G06F 21/79 380/277 |
| 2009/0119469 A1 | 5/2009 | Delantoni et al. | |

(Continued)

FOREIGN PATENT DOCUMENTS

| | | |
|---|---|---|
| JP | 2009134551 | 6/2009 |
| JP | 4688584 | 2/2011 |

(Continued)

*Primary Examiner* — William E. Baughman

(74) *Attorney, Agent, or Firm* — Volentine, Whitt & Francos, PLLC

(57) ABSTRACT

A semiconductor device includes: a memory device; and a storage controller. The storage controller includes a flash controller performing data operations on the memory device, and a processor executing a real-time operating system (RTOS) for controlling the flash controller, wherein the RTOS receives expiration time information of data from a host and performs at least one of the data operations using a scheduler based on the expiration time information.

19 Claims, 12 Drawing Sheets

(56) References Cited

U.S. PATENT DOCUMENTS

| | | | |
|---|---|---|---|
| 2011/0145306 A1 | 6/2011 | Boyd et al. | |
| 2011/0219172 A1* | 9/2011 | Lin | G06F 12/00 |
| | | | 711/103 |
| 2012/0036347 A1* | 2/2012 | Swanson | G06F 21/572 |
| | | | 713/2 |
| 2012/0079289 A1 | 3/2012 | Weng et al. | |
| 2013/0275391 A1* | 10/2013 | Batwara | G06F 16/125 |
| | | | 707/689 |
| 2013/0345844 A1 | 12/2013 | Reisman | |
| 2014/0040537 A1 | 2/2014 | Nakashima et al. | |
| 2014/0156965 A1* | 6/2014 | Yang | G06F 3/064 |
| | | | 711/172 |
| 2014/0337285 A1* | 11/2014 | Gokhale | G06F 3/065 |
| | | | 707/610 |
| 2016/0179421 A1* | 6/2016 | Hwang | G06F 3/0619 |
| | | | 711/162 |
| 2017/0010989 A1* | 1/2017 | Sugahara | G06F 13/4068 |
| 2018/0136847 A1* | 5/2018 | Maeda | G06F 3/065 |
| 2019/0114115 A1* | 4/2019 | Wille | H04L 9/0866 |

FOREIGN PATENT DOCUMENTS

| | | |
|---|---|---|
| JP | 2011048861 A | 3/2011 |
| KR | 1681401 | 11/2016 |

* cited by examiner

SEMICONDUCTOR DEVICE

This application claims the benefit of Korean Patent Application No. 10-2017-0166817, filed on Dec. 6, 2017, in the Korean Intellectual Property Office, the disclosure of which is incorporated herein in its entirety by reference.

BACKGROUND

1. Field of the Disclosure

The present disclosure relates to a semiconductor device, and more particularly, to a semiconductor device which performs data operations on a memory device.

2. Description of the Related Art

Various flash memory-based storage devices perform various data operations on a memory device. For example, after receiving a command to read or write data from a host, a storage device may perform various data operations such as read, write, program, and erase operations to process the command.

Such flash-based storage devices do not perform data operations on a single memory cell at a time due to the characteristics of a memory device. For example, read and write operations may be performed on a page-by-page basis, and an erase operation may be performed on a block-by-block basis.

Flash-based storage devices can write data to a page of a memory device only when the page is free, and updates data by performing a read-modify-write update instead of an in-place update. That is, flash-based storage devices can not immediately overwrite the same memory device.

In a flash-based storage device having such characteristics, it is important to change a stale page to a free page at an appropriate time to secure the capacity of the storage device. Therefore, there is a need for a method by which a flash-based storage device can determine whether data has expired and perform an erase operation at an appropriate time, in addition to an erase method through conventional garbage collection.

SUMMARY

Aspects of the disclosure provide a semiconductor device which can secure capacity and improve the performance of garbage collection by performing a data operation on a memory device at an appropriate time using expiration time information of data.

However, aspects of the disclosure are not restricted to this. The above and other aspects of the disclosure will become more apparent to one of ordinary skill in the art to which the disclosure pertains by referencing the detailed description of the disclosure given below.

According to an aspect of the disclosure, there is provided a semiconductor device including a memory device; and a storage controller. The storage controller includes a flash controller configured to perform data operations on the memory device, and a processor configured to execute a real-time operating system (RTOS) for controlling the flash controller, wherein the RTOS is configured to receive expiration time information of data from a host and to control the flash controller to perform at least one of the data operations using a scheduler based on the expiration time information.

According to another aspect of the disclosure, there is provided a semiconductor device including a memory device which comprises an area in which data associated with expiration time information received from a host is stored; and a storage controller. The storage controller includes a flash controller performing data operations on the memory device and a processor configured to execute a real-time operating system (RTOS) for controlling the flash controller, wherein the RTOS is configured to identify expired data among the data stored in the area based on the expiration time information, and to perform a data operation on the expired data.

According to still another aspect of the disclosure, there is provided a semiconductor device including a memory device which comprises a first area and a second area separated from the first area; and a storage controller. The storage controller includes a flash controller configured to perform data operations on the memory device, a processor configured to execute a real-time operating system (RTOS) for controlling the flash controller, and a data module configured to manage a location in the memory device at which data associated with expiration time information is to be stored, wherein the RTOS is configured to receive the expiration time information of data and a range, to which the expiration time information is applied, from the host, the data module is configured to move data corresponding to the range, to which the expiration time information is applied, from the first area to the second area, and the RTOS is configured to identify expired data among the data stored in the second area, and to perform a data operation on the expired data.

According to yet another aspect of the invention, a storage device comprises: a semiconductor memory device having a plurality of memory elements; and a storage controller. The storage controller includes: a storage device interface configured to receive first data from a host, and further configured to receive first expiration time information for the first data, a flash controller configured to store the first data in the semiconductor memory device, and a processor configured to execute instructions to cause the flash controller to delete the first data from the semiconductor memory device at a first delete time based on the first expiration time information.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
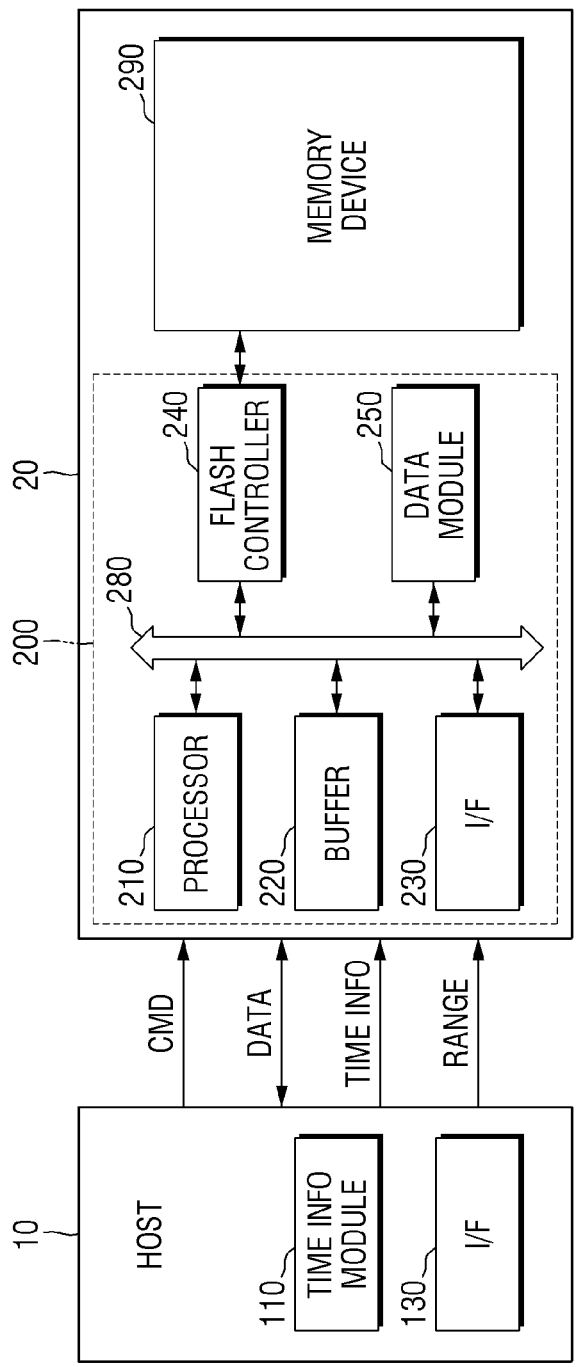
FIG. 1 is a block diagram of an embodiment of a semiconductor system.

FIG. 1 is a block diagram of an embodiment of a semiconductor system 1.

Referring to FIG. 1, semiconductor system 1 may include a host 10 and a storage device 20.

Host 10 may request data to be stored in storage device 20 or request data to be read from storage device 20. For example, host 10 may transmit a data write command CMD and data DATA to be written to storage device 20 through a host interface (I/F) 130. In addition, host 10 may transmit a data read command CMD to storage device 20 and receive read data DATA from storage device 130 through host interface 130.

Host 10 may exchange commands CMD and data DATA with storage device 20 according to an interface supported by storage device 20. In some embodiments, examples of protocols or standards to which the interface between host 10 and storage device 20 may conform include Universal Flash Storage (UFS), Small Computer System Interface (SCSI), Serial Attached SCSI (SAS), Serial Advanced Technology Attachment (SATA), Peripheral Component Interconnect Express (PCIe), embedded MultiMediaCard (eMMC), Fiber Channel (FC), Advanced Technology Attachment (ATA), Integrated Drive Electronics (IDE), and Universal Serial Bus (USB). However, these are merely examples and the present disclosure is not limited thereto— in general any interface protocol or standard that allows data to be exchanged between host 10 and storage device 20 can be employed.

In some embodiments, host 10 may be a computing device such as a personal computer, a server, a notebook computer, a tablet computer, a smart phone, or a cellular phone, but the present disclosure is not limited thereto.

Storage device 20 includes a storage controller 200 and a memory device 290.

Storage controller 200 controls the overall operation of storage device 20. For example, storage controller 200 may perform data operations on memory device 290 to write, read, or erase data requested by host 10.

Memory device 290 includes a non-volatile memory device. For example, memory device 290 may include a memory device implemented as a flash memory, a magnetoresistive random access memory (MRAM), a phase-change random access memory (PRAM), or a ferroelectric random access memory (FeRAM), but these are merely examples and the present disclosure is not limited thereto.

Storage controller 200 includes a processor 210, a buffer 220, a storage device interface 230, and a flash controller 240.

Processor 210 executes and processes software for controlling the overall operation of storage device 20. Buffer 220 may be used as a main memory for the operation of processor 210 or may be used as a cache memory for temporarily storing data. In some embodiments, buffer 220 may include a volatile memory such as a static random access memory (SRAM) or a dynamic random access memory (DRAM), but these are merely examples and the present disclosure is not limited thereto.

Storage device interface 230 is electrically connected to host interface 130 of host 10 to receive commands CMD and/or data DATA from host 10 or to provide data DATA to host 10. Storage device interface 230 and host interface 130 can exchange data using various interface protocols or standards, such as those described above.

Flash controller 240 may perform data operations such as write, read, and erase operations on memory device 290 under the control of processor 210.

In some embodiments, storage device 20 may be implemented as a solid state drive (SSD) or various kinds of flash memory-based memory cards.

Memory device 290, which can be applied to various embodiments, may logically include a plurality of blocks, and each of the blocks may include a plurality of pages, and each of these pages may comprise a plurality of addressable memory cells or data storage elements, each of which may store one or more bits of data. The pages of memory device 290 need to be changed from a stale state to a free state at an appropriate time. Specifically, since a stale page corresponds to an invalid page in which data cannot be recorded, it needs to be changed to a free page, in which data can be recorded, through a data operation such as erase.

To this end, storage controller 200 may receive a command CMD from host 10 to perform an erase data operation on memory device 290. Alternatively, free pages of memory device 290 may be secured through garbage collection performed in storage device 20.

However, in the former case, the determination about the time to secure free pages of memory device 290 is dependent on host 10, and the process of receiving a generated command CMD from host 10 increases implementation complexity. In the latter case, if the determination about the time to secure free pages of memory device 290 is dependent only on the time when the garbage collection is performed, it is difficult to quickly and efficiently secure free pages by reflecting the operating status of storage device 20.

In order to improve this situation, in various embodiments host 10 provides storage device 20 with expiration time information TIME INFO that defines the time when data recorded in memory device 290 expires. Then, storage device 20 secures free pages by performing an erase data operation on memory device 290 at an appropriate erase time based on the expiration time information TIME INFO received from host 10.

Specifically, host 10 further includes an expiration time information generation module 110. When host 10 transmits data DATA to storage device 20 together with a write command CMD, expiration time information generation module 110 generates the expiration time information TIME INFO that defines a period of time during which the data DATA is valid.

In some embodiments, the expiration time information TIME INFO may be expressed as an absolute value indicating the time when the data DATA expires. In other embodiments, the expiration time information TIME INFO may be expressed as a relative value indicating the duration from a specific time (e.g., a current time) to an expiration time. However, these are merely examples and the present disclosure is not limited thereto. The expiration time information TIME INFO can be expressed in any manner according to the specific implementation of the semiconductor system 1.

In addition, expiration time generation module 110 may generate a range RANGE of the data DATA to which the expiration time information TIME INFO is applied. The range RANGE is used to provide storage device 20 with information indicating that the same expiration time information TIME INFO is applied to n sectors (where n is a natural number), each sector having, for example, 512 bytes of data.

Storage device 20 may perform an erase data operation on memory device 290 based on the expiration time information TIME INFO and/or the range RANGE received from host 10. To this end, a real-time operating system (RTOS) 24 may be used. This will now be described with reference to FIG. 2.

Figure 2:
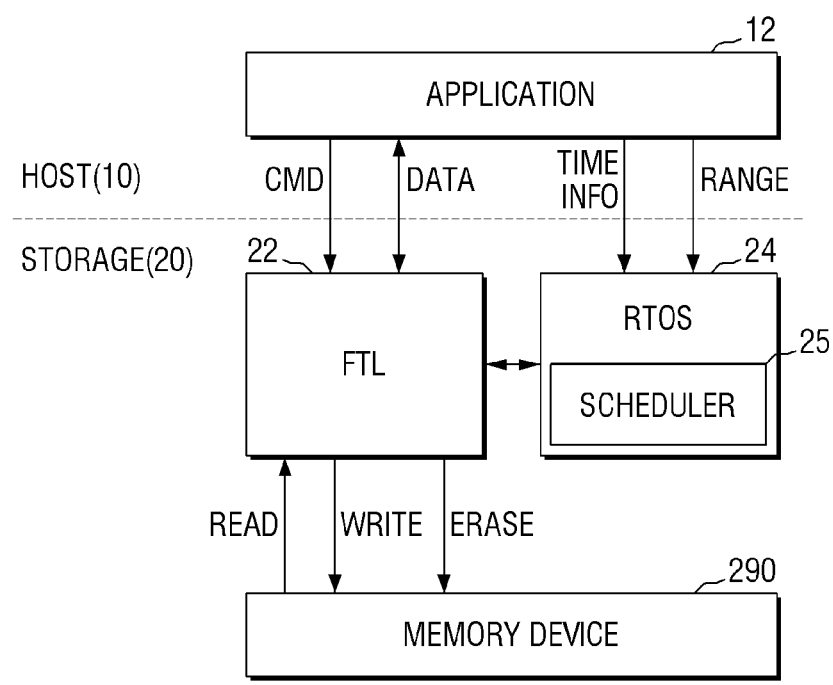
FIG. 2 is a conceptual diagram illustrating the operation of the embodiment of a semiconductor system.

FIG. 2 is a conceptual diagram illustrating the operation of semiconductor system 1 according to the embodiment of FIG. 1.

Referring to FIG. 2, in semiconductor system 1, an application 12 is executed on host 10.

Application 12 may receive input from a user, other software, or other devices, and may provide commands CMD and/or data DATA to storage device 20 so that storage device 20 can perform operations. In addition, application 12 may provide storage device 20 with the expiration time information TIME INFO and/or the range RANGE described above with reference to FIG. 1.

A flash translation layer (FTL) 22 performs logical block mapping. For example, FTL 22 may process the commands CMD and the data DATA received from host 10 by performing data operations such as read, write, and erase operations on memory device 290 using a translation table that translates a logical block address (LBA) of host 10 into a physical block address (PBA) of memory device 290. FTL 22 may also perform garbage collection on memory device 290 under the control of processor 210 of storage controller 200.

RTOS 24 is executed by processor 210 of storage controller 200. RTOS 24 includes a scheduler 25 that performs scheduling in order to process various tasks within a predetermined time. Specifically, scheduler 25 performs scheduling in order to minimize the time spent in a critical section by tasks having states such as ready, running, and blocked.

In particular, in the current embodiment, RTOS 24 may control flash controller 240 and perform a data operation on memory device 290 using scheduler 25. Specifically, RTOS 24 may receive the expiration time information TIME INFO and/or the range RANGE from host 10 and process at least one of the data operations using scheduler 25 based on the expiration time information TIME INFO and/or the range RANGE.

That is, storage controller 200 can perform a data operation on memory device 290 through FTL 22 or perform a data operation on memory device 290 using scheduler 25 of RTOS 24. Therefore, it is possible to manage memory device 290 by more quickly reflecting the operating status of storage device 20.

In particular, since an erase data operation is performed on memory device 290 according to an independent schedule of RTOS 24 without depending only on FTL 22, it is possible to secure free pages more quickly and reduce the overhead due to the garbage collection.

For ease of description, an erase data operation will be mainly described below, but the scope of embodiments is not limited to this case. That is, it is apparent to those skilled in the art that RTOS 24 according to various embodiments can perform various data operations including not only erase but also write, program, and read operations by using scheduler 25.

Figure 3:
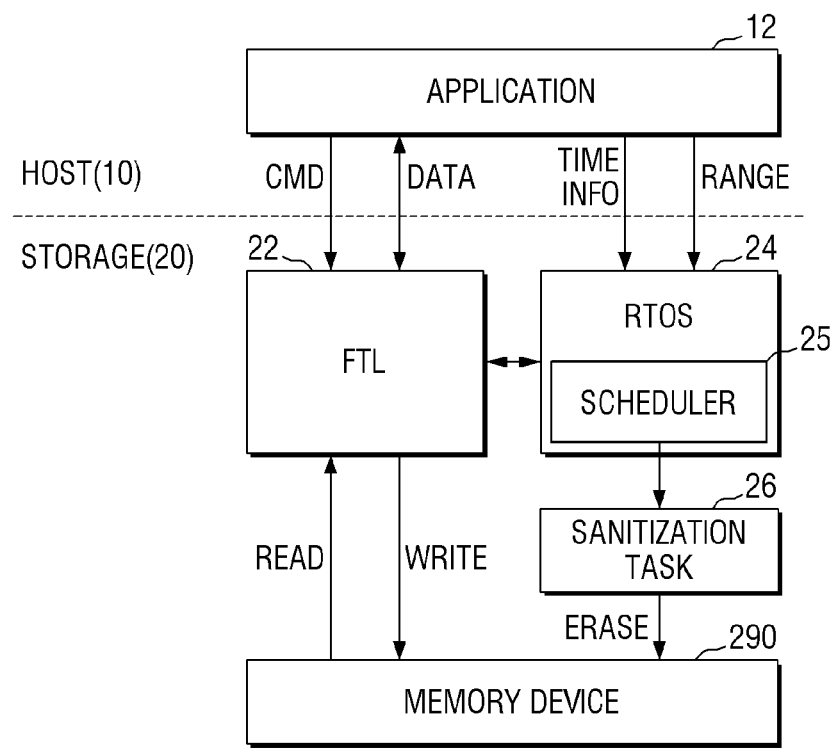
FIG. 3 is a conceptual diagram illustrating the operation of an embodiment of a semiconductor device.

FIG. 3 is a conceptual diagram illustrating the operation of an embodiment of a semiconductor device.

Referring to FIG. 3, a storage device 20, which is the semiconductor device according to the embodiment, includes an RTOS 24 which receives the expiration time information TIME INFO and/or the range RANGE from host 10 and processes at least one data operation using a scheduler 25 based on the expiration time information TIME INFO and/or the range RANGE, as described above with reference to FIG. 2.

In the current embodiment, scheduler 25 may execute a sanitization task (hereinafter, referred to as a first type task 26). First type task 26 is used to process data operations, which are processed by RTOS 24, in real time.

That is, scheduler 25 may process at least one data operation in real time by using first type task 26. Specifically, RTOS 24 may identify expired data among the data stored in a memory device 290 based on the expiration time information TIME INFO and perform an erase data operation on the expired data in real time.

Therefore, since the erase data operation is performed on memory device 290 in real time according to RTOS 24 without depending only on FTL 22, it is possible to secure free pages more quickly and reduce the overhead due to the garbage collection.

Figure 4:
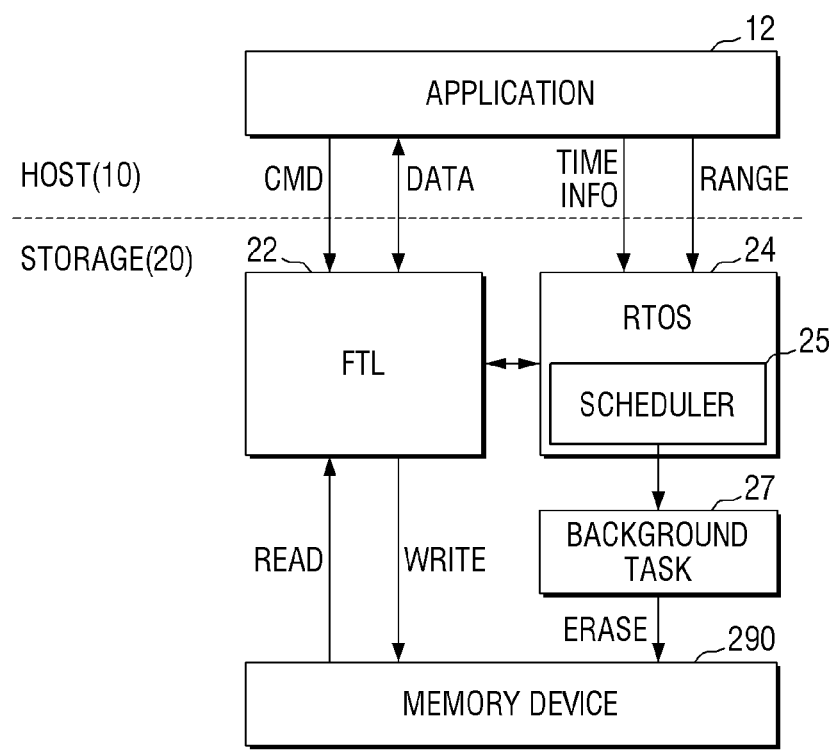
FIG. 4 is a conceptual diagram illustrating the operation of an embodiment of a semiconductor device.

FIG. 4 is a conceptual diagram illustrating the operation of an embodiment of a semiconductor device.

Referring to FIG. 4, scheduler 25 of storage device 20, which is the semiconductor device according to the embodiment, may execute a background task (hereinafter, referred to as a second type task 27), unlike in FIG. 3. Second type task 27 is used to process data operations, which are processed by RTOS 24, in the background.

That is, scheduler 25 may process at least one data operation in the background by using second type task 27. Specifically, RTOS 24 may identify expired data among the data stored in a memory device 290 based on the expiration time information TIME INFO and perform an erase data operation on the expired data in the background.

Therefore, since the erase data operation is performed on memory device 290 not only in real-Lime but also in the background according to RTOS 24 without depending only on FTL 22, it is possible to secure free pages more quickly and reduce the overhead due to the garbage collection.

Figure 5:
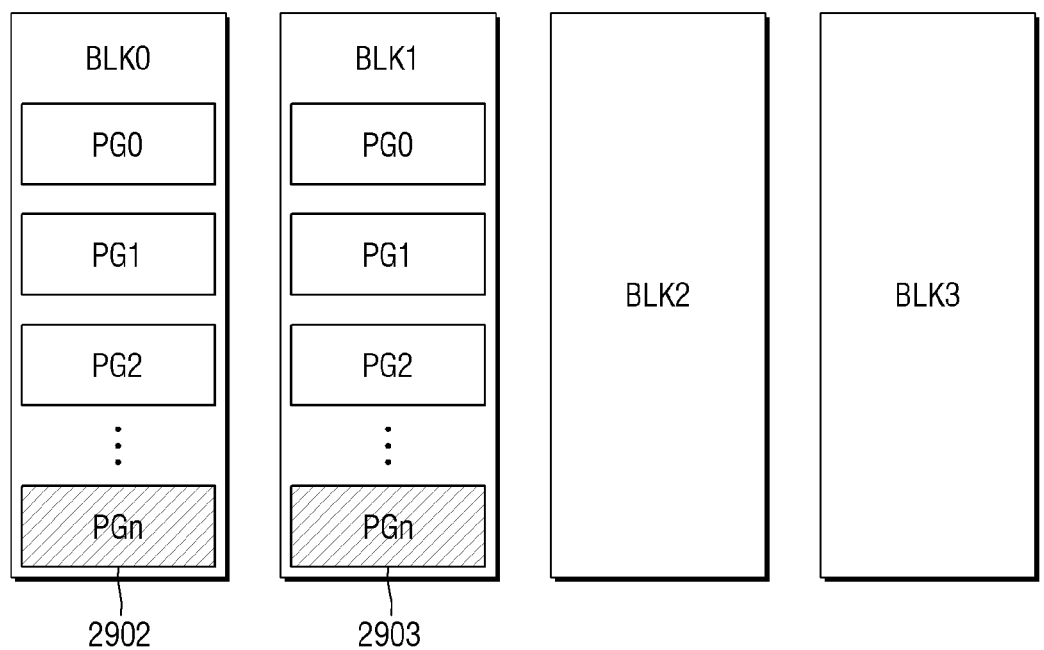
FIG. 5 is a block diagram of an embodiment of a memory device of a semiconductor device.

FIG. 5 is a block diagram of an example embodiment of a memory device of a semiconductor device.

Referring to FIG. 5, storage device 20, which is the semiconductor device according to the embodiment, may store the expiration time information TIME INFO and/or the range RANGE received from host 10 in some areas of memory device 290.

In the current embodiment, memory device 290 includes a plurality of blocks BLK0 through BLK3 that are logically separated from each other. Although four blocks are illustrated in FIG. 5 for ease of description, the scope of embodiments is not limited to this case. An erase data operation may be performed on a block-by-block basis.

A block BLK0 includes a plurality of pages PG0 through PGn (where n is a natural number) of memory cells or elements. Write and read operations may be performed on a page-by-page basis.

The expiration time information TIME INFO and/or the range RANGE, or expiration time data associated with the expiration time information TIME INFO and/or the range RANGE, may be stored in expiration time information store pages 2902 and 2903, which correspond to some pages of memory device 290, until a data operation on data associated with the expiration time information TIME INFO or data corresponding to the range RANGE is completed.

The expiration time information TIME INFO and/or the range RANGE, or expiration time data associated with the expiration time information TIME INFO and/or the range RANGE, stored in the expiration time information store pages 2902 and 2903 may be used by RTOS 24 to identify expired data among the data stored in memory device 290.

Figure 6:
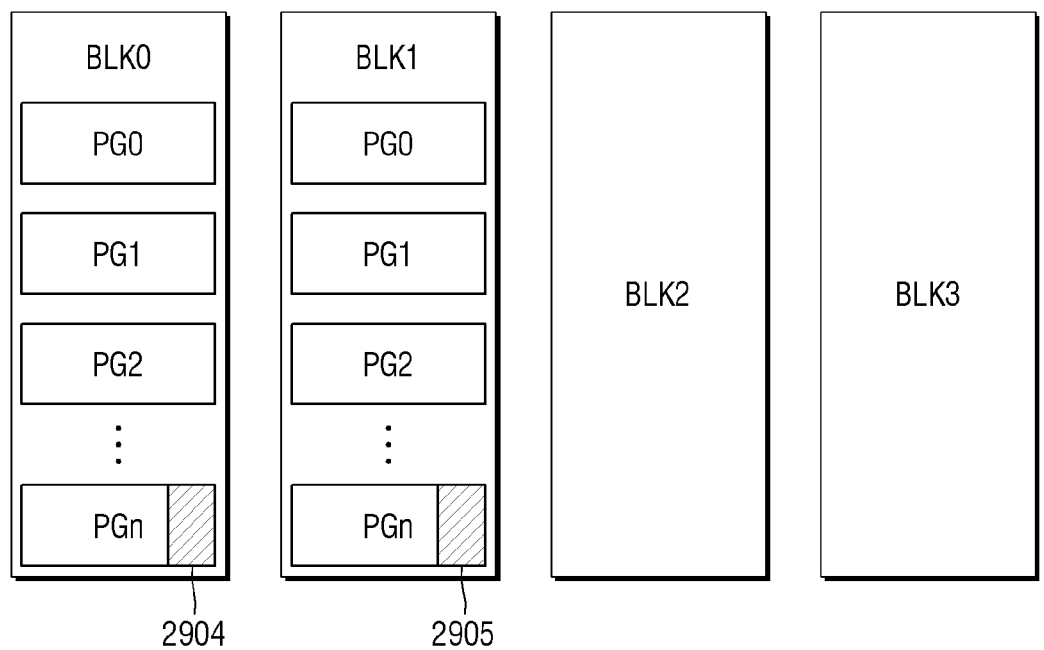
FIG. 6 is a block diagram of an embodiment of a memory device of a semiconductor device.

FIG. 6 is a block diagram of an embodiment of a memory device.

Referring to FIG. 6, storage device 20, which is the semiconductor device according to the embodiment, may store the expiration time information TIME INFO and/or the range RANGE received from host 10 in some areas of memory device 290.

The expiration time information TIME INFO and/or the range RANGE may be stored in spare areas 2904 and 2905 of some pages of memory device 290 until a data operation on data associated with the expiration time information TIME INFO or data corresponding to the range RANGE is completed.

The expiration time information TIME INFO and/or the range RANGE stored in the spare areas 2904 and 2905 may be used by RTOS 24 to identify expired data among the data stored in memory device 290.

Figure 7:
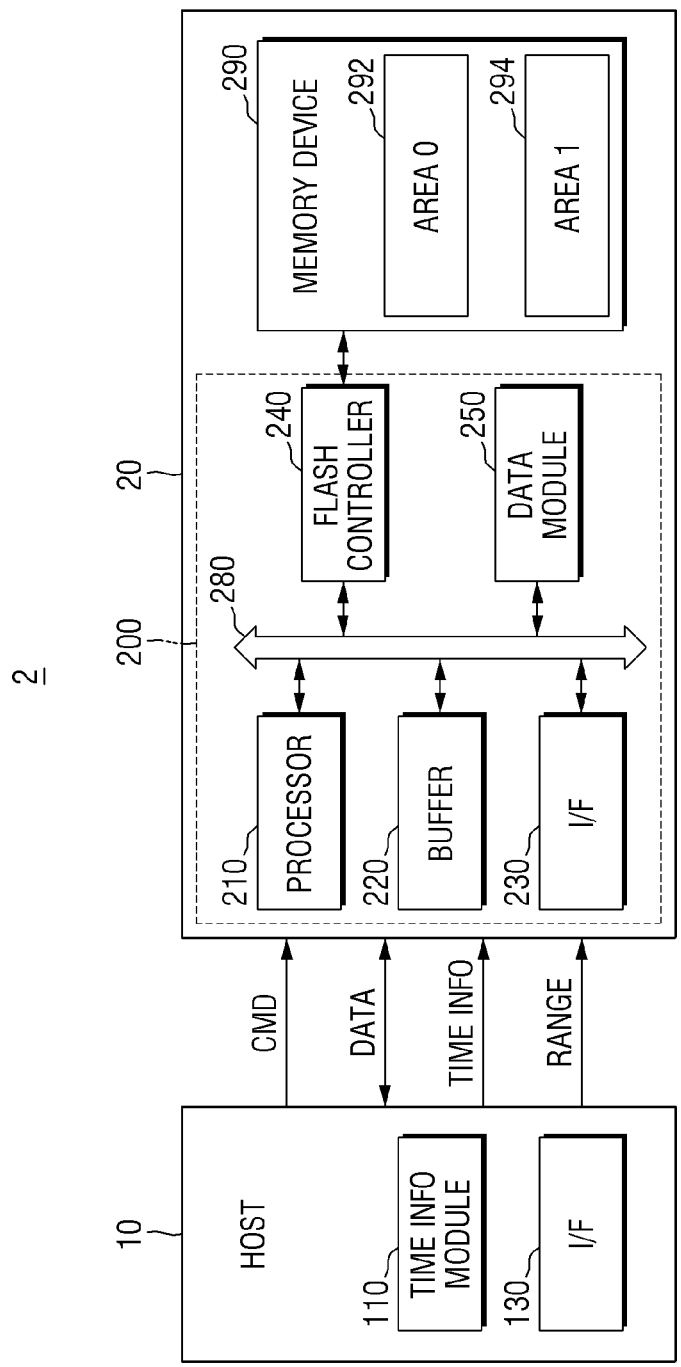
FIG. 7 is a block diagram of an embodiment of a semiconductor system.
Figure 8:
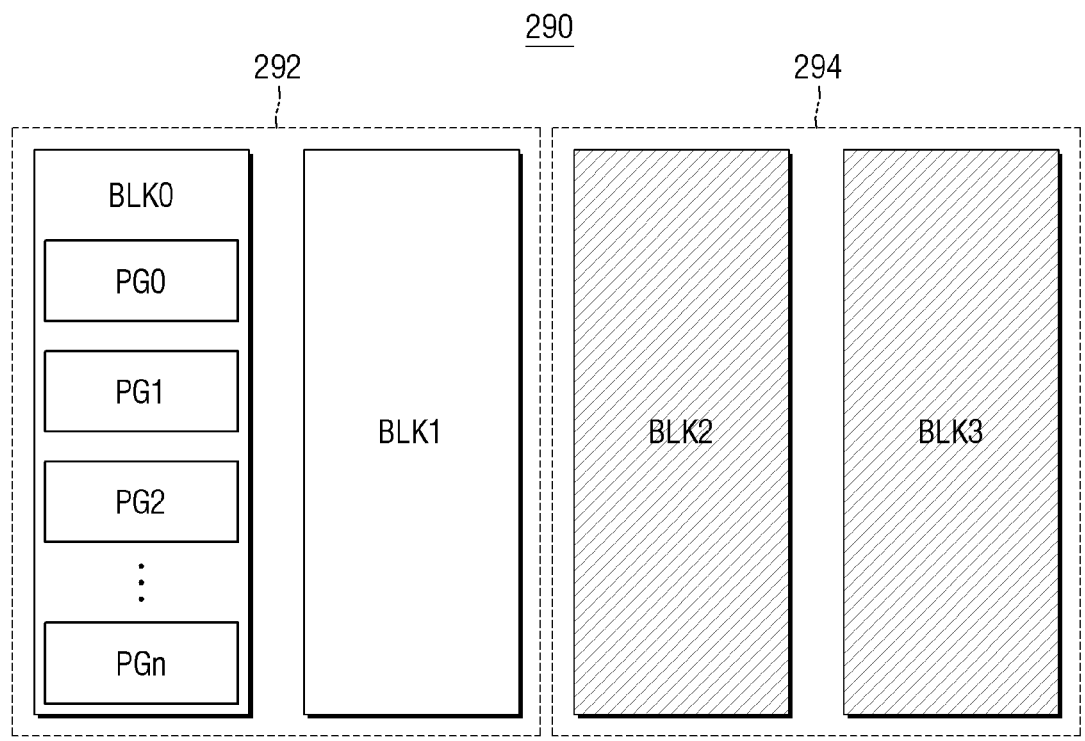
FIG. 8 is a block diagram of an embodiment of a memory device of a semiconductor device.

FIG. 7 is a block diagram of an embodiment of a semiconductor system 2, and FIG. 8 is a block diagram of an embodiment of a memory device of a semiconductor device.

Referring to FIG. 7, semiconductor system 2 may include host 10, which includes expiration time information generation module 110, and storage device 20 in which RTOS 24 operates, as described above with reference to FIG. 1.

In the current embodiment, storage controller 200 of storage device 20 may further include a data module 250.

Data module 250 manages a location, at which data given expiration time information TIME INFO and/or a range RANGE (hereinafter, referred to as data associated with the expiration time information TIME INFO and/or the range RANGE) is to be stored, in memory device 290.

Referring also to FIG. 8, in the current embodiment memory device 290 includes a first area 292 and a second area 294 separated from first area 292.

Data module 250 may manage storage locations in memory device 290 by collecting and storing the data associated with the expiration time information TIME INFO and/or the range RANGE in second area 294 and storing other data in first area 292.

That is, data module 250 may store the data associated with the expiration time information TIME INFO and/or the range RANGE in blocks BLK2 and BLK3 of memory device 290 and store other data in blocks BLK0 and BLK1 of memory device 290, thereby seeking to improve the efficiency of an erase operation performed, for example, on a block-by-block basis.

Particularly noteworthy is that data module 250 moves all of the data stored in a plurality of blocks and associated with the expiration time information TIME INFO and/or RANGE to, for example, the block BLK2, so that the erase operation performed on a block-by-block basis can be carried out quickly.

Figure 9:
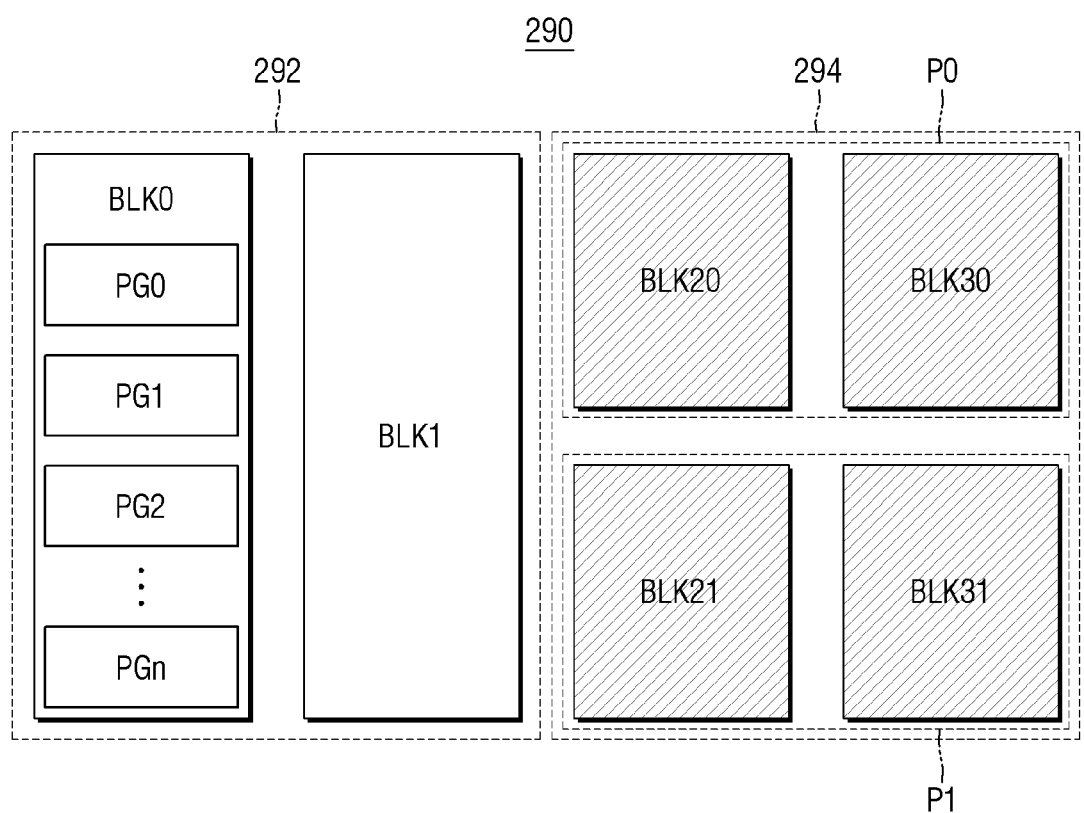
FIG. 9 is a block diagram of a memory device of an embodiment of a semiconductor device.

FIG. 9 is a block diagram of an embodiment of a memory device 290 of a semiconductor device.

Referring to FIG. 9, in the current embodiment, memory device 290 includes first area 292 and second area 294 separated from first area 292. Second area 294 may include a first partition P0 and a second partition P1 separated from the first partition P0.

Data module 250 may manage storage locations in memory device 290 by collecting and storing data (e.g., first data_associated with first expiration time information TIME INFO in the first partition P0 of second area 294, collecting and storing data (e.g., second data) associated with second expiration time information TIME INFO in the second partition P1, and storing other data in first area 292.

That is, data module 250 may store the data associated with the first expiration time information TIME INFO in blocks BLK20 and BLK30 of memory device 290, store the data associated with the second expiration time information TIME INFO in blocks BLK21 and BLK31 of memory device 290 and store other data in blocks BLK0 and BLK1 of memory device 290, thereby seeking to improve the efficiency of an erase operation performed, for example, on a block-by-block basis.

Particularly noteworthy is that data module 250 moves all of the data stored in a plurality of blocks and associated with the first expiration time information TIME INFO and the second expiration time information TIME INFO to, for example, the blocks BLK20 and BLK30 and the blocks BLK21 and BLK31, respectively, so that the erase operation performed on a block-by-block basis can be carried out quickly.

Figure 10:
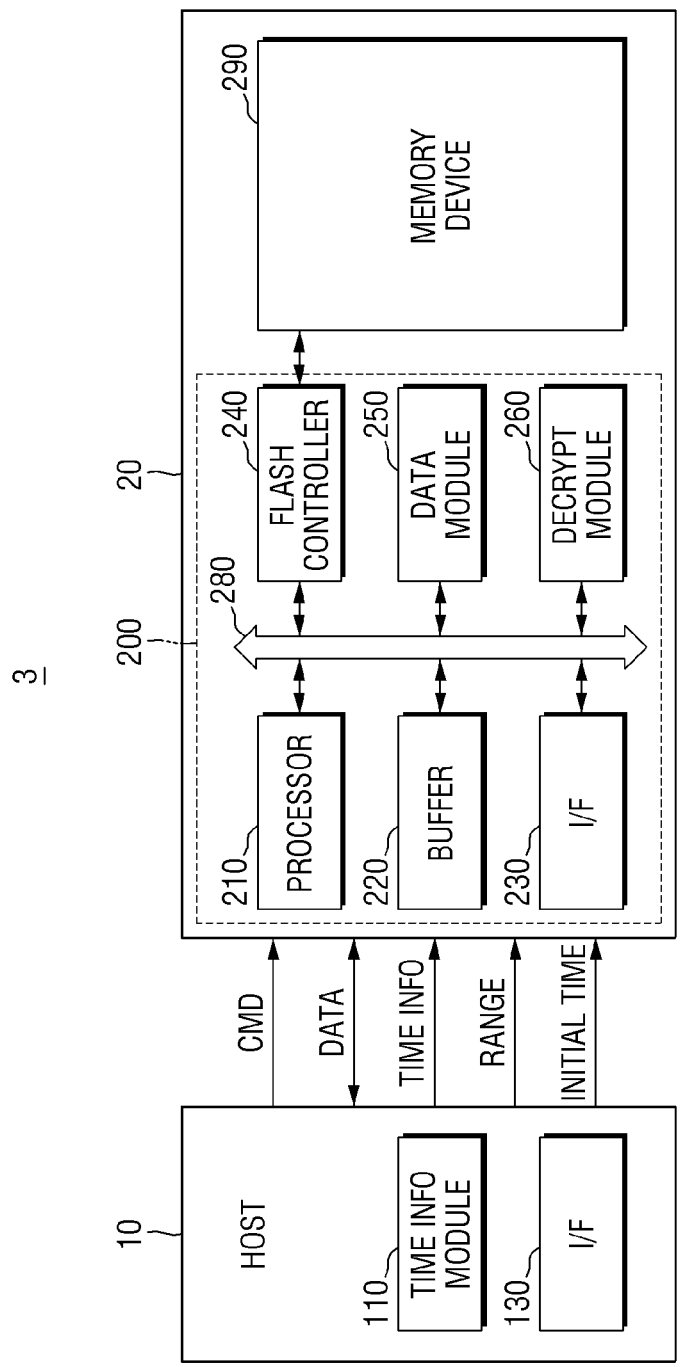
FIG. 10 is a block diagram of an embodiment of a semiconductor system.
Figure 11:
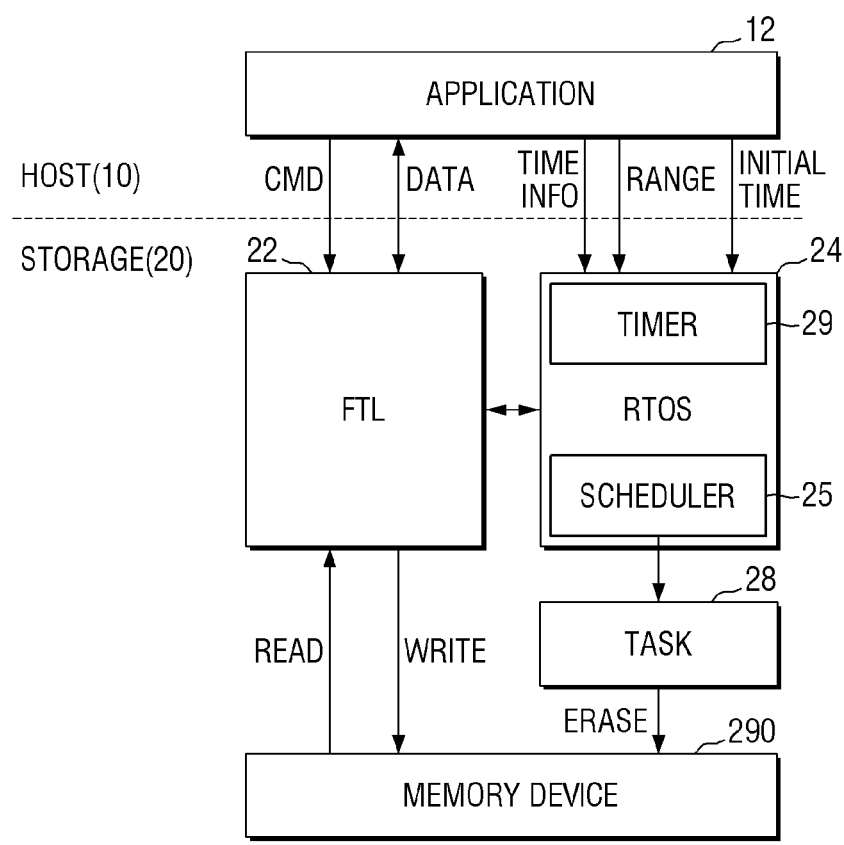
FIG. 11 is a conceptual diagram illustrating the operation of an embodiment of a semiconductor device.

FIG. 10 is a block diagram of an embodiment of a semiconductor system 3, and FIG. 11 is a conceptual diagram illustrating the operation of an embodiment of a semiconductor device.

Referring to FIG. 10, semiconductor system 3 may include host 10, which includes expiration time information generation module 110, and storage device 20 in which RTOS 24 operates, as described above with reference to FIG. 1.

In the current embodiment, RTOS 24 may receive initial time information INITIAL TIME from host 10 to perform time synchronization. Here, the initial time information INITIAL TIME may include, for example, current time information of host 10.

RTOS 24 may determine the time to perform a data operation on data associated with expiration time information TIME INFO and/or a range RANGE by using the initial time information INITIAL TIME received from host 10.

In some embodiments, such time synchronization between host 10 and storage device 20 may be performed at a time when storage device 20 is initializing or may be performed at any time during the operation of storage device 20.

Referring also to FIG. 11, storage device 20, which is the semiconductor device according to the embodiment, includes RTOS 24 which receives the initial time information INITIAL TIME and the expiration time information TIME INFO and/or the range RANGE from host 10 and processes at least one data operation using a scheduler 25 based on the expiration time information TIME INFO and/or the range RANGE.

RTOS 24 provides a timer 29 that can be used by scheduler 25 to process a task, and timer 29 provides time information to scheduler 25 so that scheduler 25 can determine the time to perform an erase data operation based on the initial time information INITIAL TIME received from host 10.

Then, scheduler 25 executes a task 28 such as first type task 26 or second type task 27 described above with reference to FIG. 3 or FIG. 4, so that an erase data operation can be performed according to a schedule corresponding to the characteristics of task 28.

Referring again to FIG. 10, in the current embodiment, storage controller 200 of storage device 20 may further include decrypt module 260.

When host 10 encrypts the initial time information INITIAL TIME and/or the range RANGE and provides the encrypted initial time information INITIAL TIME and/or range RANGE to storage device 20, decrypt module 260 decrypts the encrypted initial time information INITIAL TIME and/or range RANGE in a time synchronization process.

Then, RTOS 24 may determine the time to process a data operation on the data associated with the decrypted initial time information INITIAL TIME and/or range RANGE.

Figure 12:
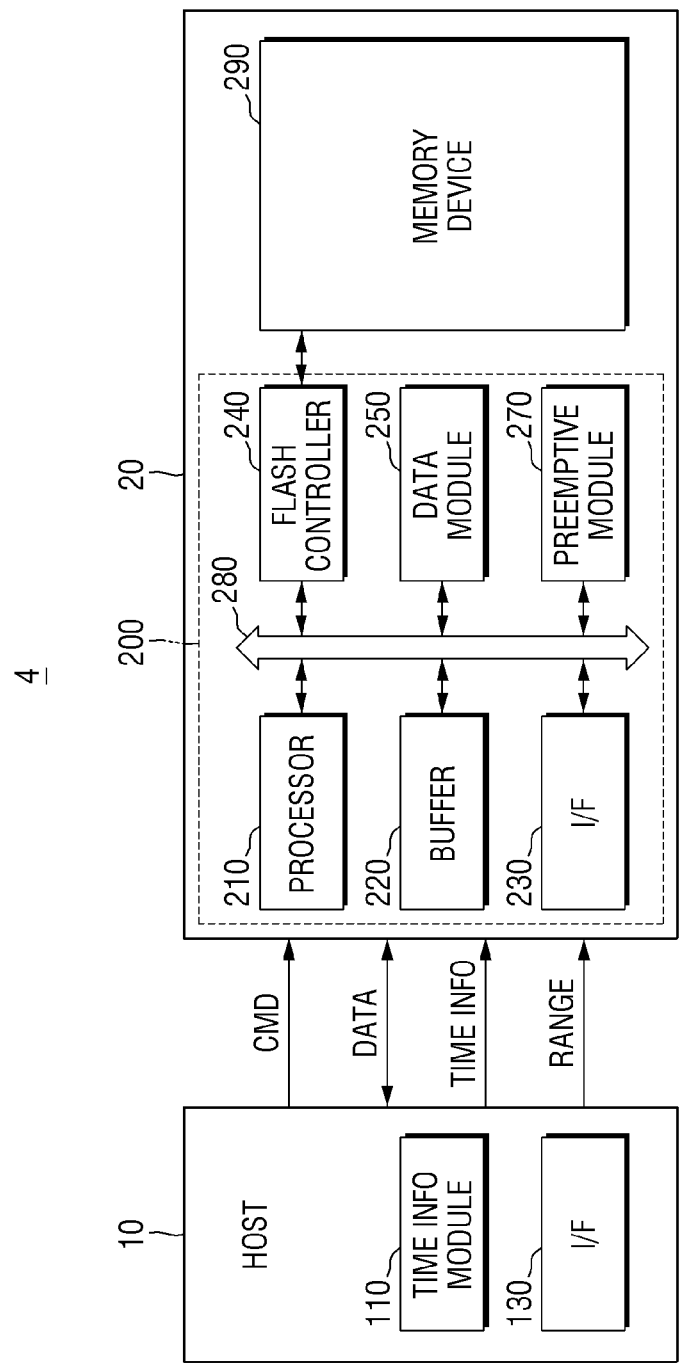
FIG. 12 is a block diagram of an embodiment of a semiconductor system.

FIG. 12 is a block diagram of an embodiment of a semiconductor system 4.

Referring to FIG. 12, semiconductor system 4 may include host 10, which includes expiration time information generation module 110, and storage device 20 in which RTOS 24 operates, as described above with reference to FIG. 1.

In the current embodiment, storage controller 200 of storage device 20 may further include a preemptive module 270. Depending on the implementation, preemptive module 270 can also be included in RTOS 24.

Preemptive module 270 can change the processing priority of a data operation on data associated with initial time information INITIAL TIME and/or a range RANGE received from host 10.

For example, when there are a plurality of write data operations to be successively processed and a read data operation corresponding to a next priority, preemptive module 270 may perform the read data operation on data, on which an erase data operation is scheduled to be performed, before the write data operations.

In this way, preemptive module 270 can guarantee a response to a request from host 10.

According to the various embodiments described so far, host 10 provides storage device 20 with expiration time information TIME INFO that defines the time when data written to a memory device 290 expires, and storage device 20 secures free pages by performing an erase data operation on memory device 290 at an appropriate time based on the expiration time information TIME INFO received from host 10. Therefore, it is possible to quickly and efficiently secure free pages by reflecting the operating status of storage device 20 and reduce the overhead of the garbage collection.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

Some blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other suitable form of storage medium known in the art.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A semiconductor device, comprising:
a memory device; and
a storage controller which includes,
a flash controller configured to perform data operations on the memory device, and
a processor configured to execute a real-time operating system (RTOS) for controlling the flash controller,
wherein the RTOS is configured to receive initial time information from a host,
wherein the RTOS is configured to receive expiration time information of data from the host and to control the flash controller to perform at least one of the data operations using a scheduler based on the expiration time information, and
wherein the RTOS is configured to perform time synchronization, wherein the storage controller synchronizes the scheduler in time with the host using the initial time information received from the host, and to determine a time to process the at least one of the data operations on the data associated with the expiration time information by using the initial time information and the expiration time information.

2. The semiconductor device of claim 1, wherein the RTOS is configured to receive from the host a range of data, to which the expiration time information is applied, together with the expiration time information, and to process at least one of the data operations based on the expiration time information and the range.

3. The semiconductor device of claim 1, wherein the expiration time information is stored in the memory device until a data operation associated with the expiration time information is completed.

4. The semiconductor device of claim 3, wherein the memory device stores the expiration time information in a spare area of a page.

5. The semiconductor device of claim 1, wherein the scheduler is configured to process at least one of the data operations in real time by using a first type task.

6. The semiconductor device of claim 1, wherein the scheduler is configured to process at least one of the data operations in background by using a second type task.

7. The semiconductor device of claim 1, wherein the storage controller further comprises a data module which is configured to manage a location, at which data associated with the expiration time information is to be stored, in the memory device.

8. The semiconductor device of claim 7, wherein the memory device comprises a first area and a second area separated from the first area, and the data module is configured to store the data associated with the expiration time information in the second area.

9. The semiconductor device of claim 8, wherein the expiration time information comprises first expiration time information and second expiration time information, and the second area comprises a first partition and a second partition separated from the first partition, wherein the data module is configured to store first data associated with the first expiration time information in the first partition, and to store second data associated with the second expiration time information in the second partition.

10. The semiconductor device of claim 1, wherein the time synchronization is performed at a time when the semiconductor device is initializing.

11. The semiconductor device of claim 10, wherein the initial time information received from the host is encrypted as encrypted initial time information, and the storage controller further comprises a decrypt module which is configured to decrypt the encrypted initial time information.

12. A semiconductor device, comprising:
a memory device which includes an area in which data associated with expiration time information received from a host is stored; and
a storage controller which includes,
a flash controller configured to perform data operations on the memory device, and
a processor is configured to execute a real-time operating system (RTOS) for controlling the flash controller,
wherein the RTOS is configured to receive initial time information from the host to perform time synchronization between the storage controller and the host using the initial time information received from the host, and
wherein the RTOS is configured to identify expired data among the data stored in the area based on the initial time information and the expiration time information, and to determine a time to perform the at least one of the data operations on the expired data by using the initial time information and the expiration time information.

13. The semiconductor device of claim 12, wherein the expiration time information comprises first expiration time information and second expiration time information, and the area comprises a first partition and a second partition separated from the first partition, wherein first data associated with the first expiration time information is stored in the first partition, and second data associated with the second expiration time information is stored in the second partition.

14. The semiconductor device of claim 12, wherein the RTOS is configured to receive a range of data, to which the expiration time information is applied, from the host together with the expiration time information, and is configured to process at least one of the data operations based on the expiration time information and the range.

15. The semiconductor device of claim 12, wherein the RTOS is configured to perform the data operation on the expired data in real time.

16. The semiconductor device of claim 12, wherein the RTOS is configured to perform the data operation on the expired data in background.

17. A semiconductor device, comprising:
a memory device which comprises a first area and a second area separated from the first area; and
a storage controller which includes,
a flash controller configured to perform data operations on the memory device,
a processor configured to execute a real-time operating system (RTOS) configured to control the flash controller, and
a data module configured to manage a location in the memory device at which data associated with expiration time information is to be stored,
wherein the RTOS is configured to receive initial time information from the host and to synchronize the storage controller in time to the host using the initial time information received from the host,
wherein the RTOS is configured to receive from a host the expiration time information of the data and a range, to which the expiration time information is applied,
wherein the data module is configured to move the data corresponding to the range, to which the expiration time information is applied, from the first area to the second area,
wherein the RTOS is configured to identify expired data among the data stored in the second area, to determine a time to perform the at least one of the data operations on the expired data by using the initial time information and the expiration time information, and to perform at least one of the data operations on the expired data at the determined time.

18. The semiconductor device of claim 17, wherein the expiration time information comprises first expiration time information and second expiration time information, and the second area comprises a first partition and a second partition separated from the first partition, wherein first data associated with the first expiration time information is stored in the first partition, and second data associated with the second expiration time information is stored in the second partition.

19. The semiconductor device of claim 17, wherein the expiration time information is stored in the memory device until the data operation associated with the expired data is completed.

* * * * *